United States Patent
Li et al.

(10) Patent No.: US 9,559,980 B2
(45) Date of Patent: *Jan. 31, 2017

(54) INTER-DOMAIN SDN TRAFFIC ENGINEERING

(71) Applicant: Huawei Technologies Co., Ltd., Shenzhen (CN)

(72) Inventors: Xu Li, Nepean (CA); Petar Djukic, Ottawa (CA); Hang Zhang, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 291 days.

This patent is subject to a terminal disclaimer.

(21) Appl. No.: 14/168,682

(22) Filed: Jan. 30, 2014

(65) Prior Publication Data

US 2015/0215235 A1    Jul. 30, 2015

(51) Int. Cl.
*H04L 12/28* (2006.01)
*H04L 12/915* (2013.01)
(Continued)

(52) U.S. Cl.
CPC ............. *H04L 47/785* (2013.01); *H04L 45/04* (2013.01); *H04L 47/125* (2013.01); *H04L 47/70* (2013.01);
(Continued)

(58) Field of Classification Search
CPC ....... H04L 47/785; H04L 47/724; H04L 45/04
See application file for complete search history.

(56) References Cited

U.S. PATENT DOCUMENTS 6,636,721 B2 * 10/2003 Threadgill ......... H04B 7/18506
455/12.1
8,059,546 B2    11/2011 Pai et al.
(Continued)

OTHER PUBLICATIONS

"Notification of Transmittal of the International Search Report and the Written Opinion of the International Searching Authority, or the Declaration," Applicant: Huawei Technologies Co., Ltd., PCT/US15/13064, filed Jan. 27, 2015, mailed Apr. 29, 2015, 11 pages.
(Continued)

*Primary Examiner* — Wei Zhao
(74) *Attorney, Agent, or Firm* — Slater Matsil, LLP

(57) ABSTRACT

Constraining resource provisioning by domain controllers based on resource requirements projected for remotely-originating inter-domain traffic can improve utilization efficiency and link reliability in multi-domain software defined network (SDN) architectures. A domain controller may be required to reserve a portion of inter-domain link capacity for transporting remotely-originating traffic. This may limit the inter-domain link capacity available for transporting locally-originating traffic in a manner that ensures remotely-originating traffic flows have equitable and/or adequate access to resources of inter-domain links. Alternatively, a domain controller may be required to maintain a minimum throughput rate for remotely-originating traffic, which may cause remotely-originating traffic to be prioritized over locally-originating traffic when necessary to maintain the minimum throughput rate. Provisioning constraints can be generated in a centralized or distributed fashion.

24 Claims, 14 Drawing Sheets

(51) Int. Cl.
  *H04L 12/911* (2013.01)
  *H04L 29/08* (2006.01)
  *H04L 12/715* (2013.01)
  *H04L 12/803* (2013.01)
  *H04L 12/913* (2013.01)
  *H04L 12/927* (2013.01)

(52) U.S. Cl.
  CPC ........... *H04L 47/724* (2013.01); *H04L 47/782* (2013.01); *H04L 47/827* (2013.01); *H04L 67/02* (2013.01); *H04L 45/64* (2013.01); *H04L 47/805* (2013.01)

(56) References Cited

U.S. PATENT DOCUMENTS

| | | |
|---|---|---|
| 8,369,344 B1 | 2/2013 | Krishnan et al. |
| 2005/0256972 A1* | 11/2005 | Cochran ............... H04L 69/329 709/245 |
| 2006/0182119 A1 | 8/2006 | Li et al. |
| 2007/0064647 A1 | 3/2007 | Prasad |
| 2012/0224506 A1* | 9/2012 | Gredler ................. H04L 45/04 370/254 |
| 2013/0250770 A1 | 9/2013 | Zou et al. |
| 2013/0250940 A1 | 9/2013 | Parlamas et al. |
| 2013/0329601 A1 | 12/2013 | Yin et al. |
| 2015/0188837 A1* | 7/2015 | Djukic .................. H04L 47/70 709/226 |

OTHER PUBLICATIONS

Chamania, M., et al., "An Adaptive Inter-Domain PCE Framework to Improve Resource Utilization and Reduce Inter-Domain Signaling," Optical Switching and Networking, vol. 6, No. 4, Dec. 2009. pp. 259-267.

Wu, Q., et al., "BGP Attribute for North-Bound Distribution of Traffic Engineering (TE) Performance Metrics." IDR Working Group Internet-Draft, Oct. 21, 2013, 14 pages.

\* cited by examiner

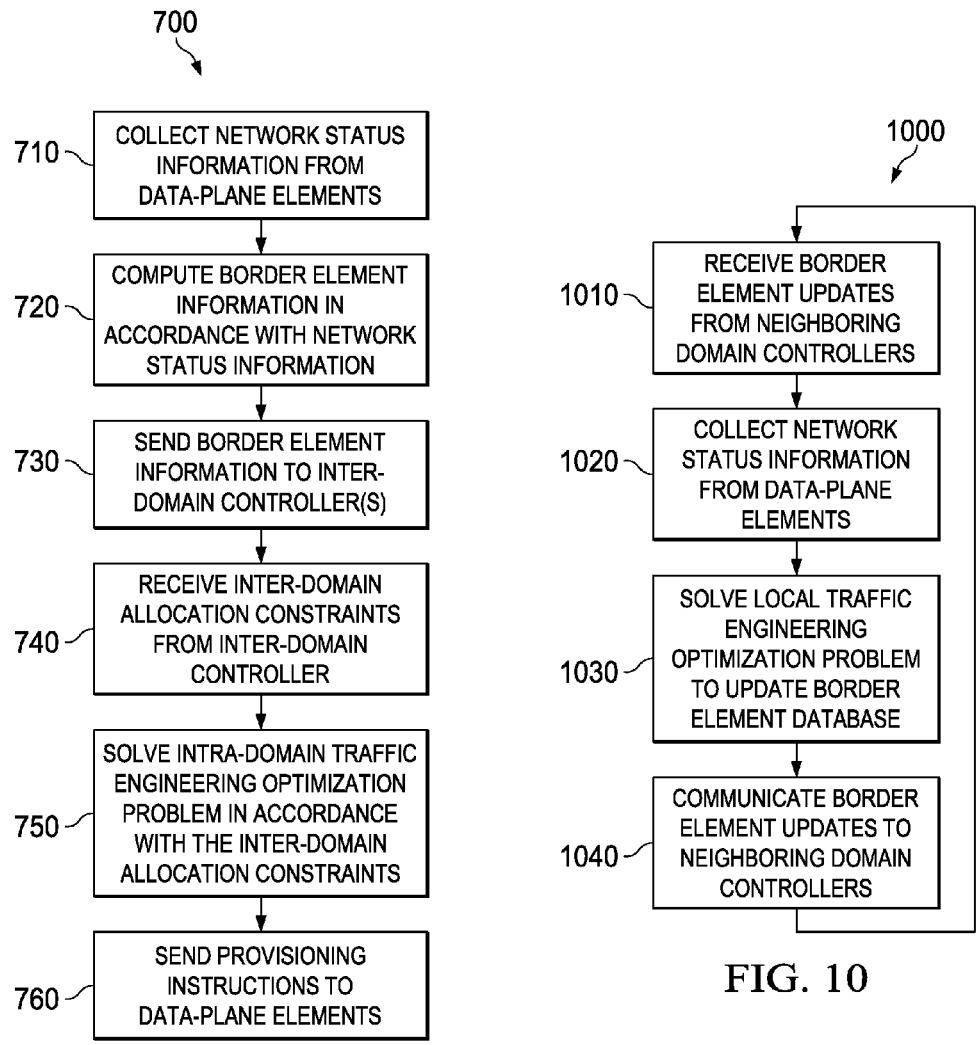

INTER-DOMAIN SDN TRAFFIC ENGINEERING

CROSS-REFERENCE TO RELATED APPLICATIONS

One or more aspects disclosed in the present application may generally relate to U.S. Non-Provisional application Ser. No. 14/141,077, filed on Dec. 26, 2013 and entitled "Hierarchical Software-Defined Network Traffic Engineering Controller," which is hereby incorporated by reference herein as if reproduced in its entirety.

TECHNICAL FIELD

The present invention relates generally to telecommunications, and in particular embodiments, to mechanisms and techniques for inter-domain software-defined network traffic engineering.

BACKGROUND

Software-defined networking (SDN) allows network administrators to manage network services through abstraction of lower level functionality. One strategy in SDN is to reduce network complexity by decoupling the control plane from the data plane. This can be achieved using an SDN controller to manage resource provisioning in a network, thereby alleviating processing load from the switching components. Notably, centralized SDN controllers may require feedback information (e.g., buffer status information, delay statistics, etc.) from the switching devices and/or users in order to make intelligent provisioning decisions. This may create a bottle neck in large networks, as latencies involved with collecting network information and distributing provisioning instructions may significantly delay policy implementation. Moreover, traffic engineering may become processing intensive for SDN controllers servicing large networks, as the computational complexity of optimization algorithms increase significantly as additional links are added to the network. Accordingly, mechanisms for applying SDN provisioning techniques to large networks in an efficient and scalable manner are desired.

SUMMARY OF THE INVENTION

Technical advantages are generally achieved, by embodiments of this disclosure which describe inter-domain SDN Traffic Engineering techniques.

In accordance with an embodiment, a method for resource provisioning in software defined networking (SDN) architectures is provided. In this example, the method includes receiving border element information from multiple SDN controllers, computing inter-domain allocation constraints in accordance with the border element information, and sending the inter-domain allocation constraints to at least a first SDN controller in the multiple SDN controllers. The first SDN controller is assigned to a first domain of the network. The first domain is connected to a second domain of the network via one or more inter-domain links. The inter-domain allocation constraints are configured to reserve resources on the one or more inter-domain links for inter-domain traffic originating from outside the first domain. An apparatus for performing this method is also provided.

In accordance with another embodiment, another method for resource provisioning in software defined networking (SDN) architectures is provided. In this example, the method includes reporting border element information to an inter-domain traffic engineering (TE) controller. The border element information corresponds to a first domain of a network, which is connected to a second domain of the network via one or more inter-domain links. The method further includes receiving inter-domain allocation constraints from the inter-domain TE controller, identifying an inter-domain resource reservation in accordance with the inter-domain allocation constraints, and provisioning resources in the first domain in accordance with the inter-domain resource reservation. The inter-domain resource reservation reserves resources on the one or more inter-domain links for inter-domain traffic originating from outside the first domain. An apparatus for performing this method is also provided.

In accordance with yet another embodiment, a method for distributed inter-domain resource provisioning in a multi-domain software defined network (SDN) is provided. In this example, the method includes receiving inter-domain rate allocation information from at least a first neighboring SDN controller. The SDN controller that receives the inter-domain rate allocation is assigned to a domain, and the first neighboring SDN controller is assigned to a first neighboring domain that is connected to the domain via one or more inter-domain links. The method further includes computing an inter-domain resource reservation in accordance with the inter-domain rate allocation information, and provisioning resources in the domain in accordance with the resource reservation. The inter-domain resource reservation reserves resources on the one or more inter-domain links for inter-domain traffic originating from outside the first domain. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 7 illustrates a flow chart of an embodiment method for provisioning resources in accordance with inter-domain allocation constrains;

FIG. 10 illustrates a flow chart of another embodiment method for computing inter-domain allocation constrains;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
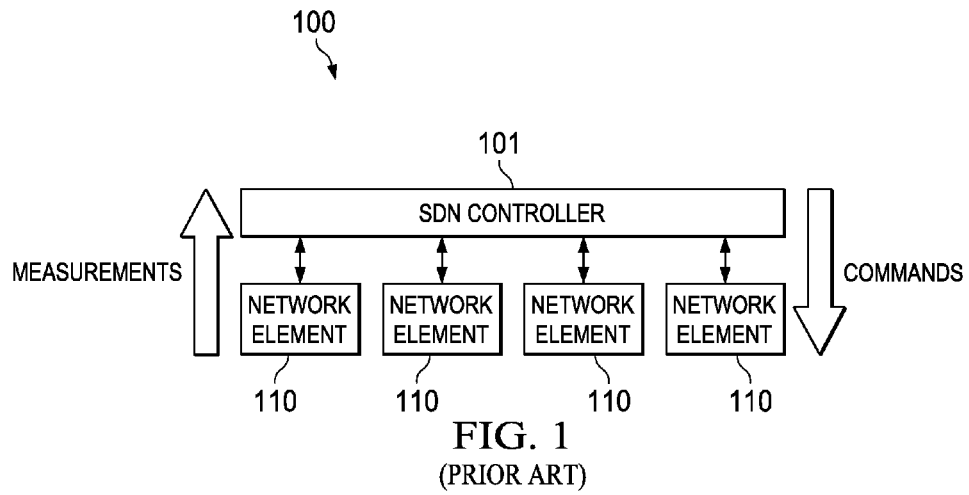
FIG. 1 illustrates a diagram of a conventional SDN architecture.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Networks that become too large to be effectively managed by a single traffic engineering (TE) controller are often split into multiple domains, where resource provisioning can be handled in a distributed fashion by local TE controllers assigned specifically to the domains (hereinafter referred to as "domain controllers"). Domain controllers generally perform resource provisioning for intra-domain traffic, as well as for outwardly bound inter-domain traffic, by setting forwarding tables in network nodes of the domain. The forwarding tables may determine which traffic is forwarded over which links, traffic priorities, and various other network parameters affecting efficiency and throughput.

In order to provision resources in an efficient fashion, domain controllers may attempt to gauge or project future resource requirements based on network status information that is dynamically reported by data-plane elements (e.g., border routers, core routers, etc.) in their respective domains. By way of example, a domain controller may predict how much traffic will be transported over a link (or set of links) during a future period based on buffer status reports. Notably, domain controllers generally have good access to network status information pertaining to their respective domains, and consequently are typically able to accurately project resource requirements for traffic originating from inside their domain (referred to herein as "locally-originating traffic"). However, domain controllers may have limited access (or no access) to network status information pertaining to other domains, and consequently may be unable to accurately predict resource requirements for inter-domain traffic originating from outside their respective domain (referred to herein as "remotely-originating inter-domain traffic" or "remotely-originating traffic" for short). This can lead to inefficient resource provisioning in SDN networks experiencing high volumes or substantial variations in inter-domain traffic.

Disclosed herein are SDN traffic engineering techniques that constrain resource provisioning by domain controllers based on resource requirements projected for remotely-originating inter-domain traffic. In one embodiment, a domain controller is required to reserve a portion of inter-domain link capacity for transporting remotely-originating traffic. This may limit the inter-domain link capacity available for transporting locally-originating traffic in a manner that ensures remotely-originating traffic flows have equitable and/or adequate access to resources of inter-domain links. In another embodiment, the domain controller is required to maintain a minimum throughput rate for remotely-originating traffic, which may prompt remotely-originating traffic to be prioritized over locally-originating traffic when necessary to maintain the minimum throughput rate. In some embodiments, resources of intra-domain links of a domain may be reserved for transporting remotely originating inter-domain traffic within the domain. For example, the intra-domain resources may be reserved for transporting pass-through remotely originating inter-domain traffic (e.g., traffic that pass through the domain) as well as for transporting locally terminating inter-domain traffic (e.g., traffic destined for a data-plane entity located within the domain). Embodiment techniques for reserving/provisioning intra-domain link resources based on resource requirements of remotely originating traffic may be similar in some respects to embodiment techniques for reserving inter-domain link resources based on resource requirements of remotely originating traffic. The provisioning constraints can be generated in a centralized or distributed fashion. These and other inventive aspects are described in greater detail below.

FIG. 1 illustrates a conventional SDN architecture 100 in which an SDN controller 101 handles resource provisioning for network elements 110. As shown, the SDN controller 101 receives measurements from the network elements 110, computes provisioning commands via an optimization algorithm, and distributes the provisioning commands to the network elements 110. The computational complexity of the optimization algorithm increases as more network elements 110 are added to the network, as well as when additional variables (e.g., wireless interference, path loss, etc.) are factored into the optimization algorithm. This increased complexity (along with control plane latency) may cause SDN provisioning to be unsuitable for large networks.

Large networks may be sub-divided into domains, which are more manageable from an SDN traffic engineering perspective. The domains may be established in physical or virtual contexts. For example, physical domains may be established based on, inter alia, geographical and/or operational features of the network. As another example, virtual domains may be established for different groups of related traffic/service flows.

Figure 2:
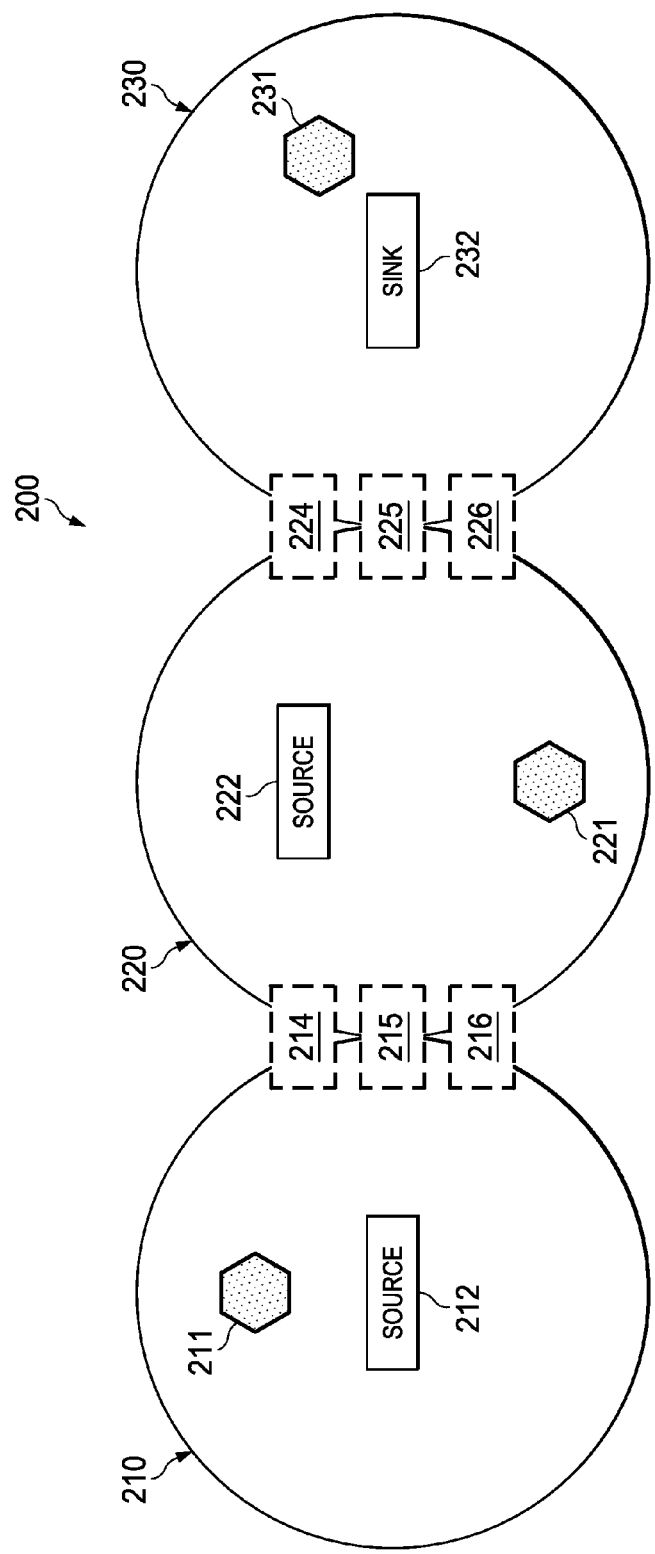
FIG. 2 illustrates a diagram of a multi-domain SDN architecture.

FIG. 2 illustrates a network 200 comprising domains 210, 220, 230 in which resource provisioning is managed by domain controllers 211, 221, 231. As shown, the domain 210 is connected to the domain 220 by inter-domain links 214, 215, 216, while the domain 220 is connected to the domain 230 by inter-domain links 224, 225, 226. The domain controllers 211, 221, 231 may be SDN controllers that have reasonably good access to network status information generated by data-plane entities within their respective domains, but have somewhat limited access (or no access) to network status information generated by entities located outside their respective domains. As a result, the domain controllers 211, 221, 231 may be able to predict resource requirements of locally-originating demands with a higher degree of accuracy than resource requirements of remotely-originating traffic. As an example, assume that the source 212 and the source 222 are attempting to communicate traffic flows to the sink 232 during a common period. The domain controller 221 may be able to predict or gauge resource requirements of the traffic flow originating from the source 222 during the period based on network status information (e.g., buffer status reports, etc.) collected from the source 222. However, the domain controller 221 may have limited access (or no access) to network status information generated by the source 212 since the source 212 is located outside the domain 220, and therefore may be unable to predict resource requirements for the traffic flow originating from the source 212. As a result, the domain controller 221 may provision too many (or too few) resources for the traffic flow originating from the source 212, thereby reducing resource utilization efficiency or performance in the network 200.

Figure 3:
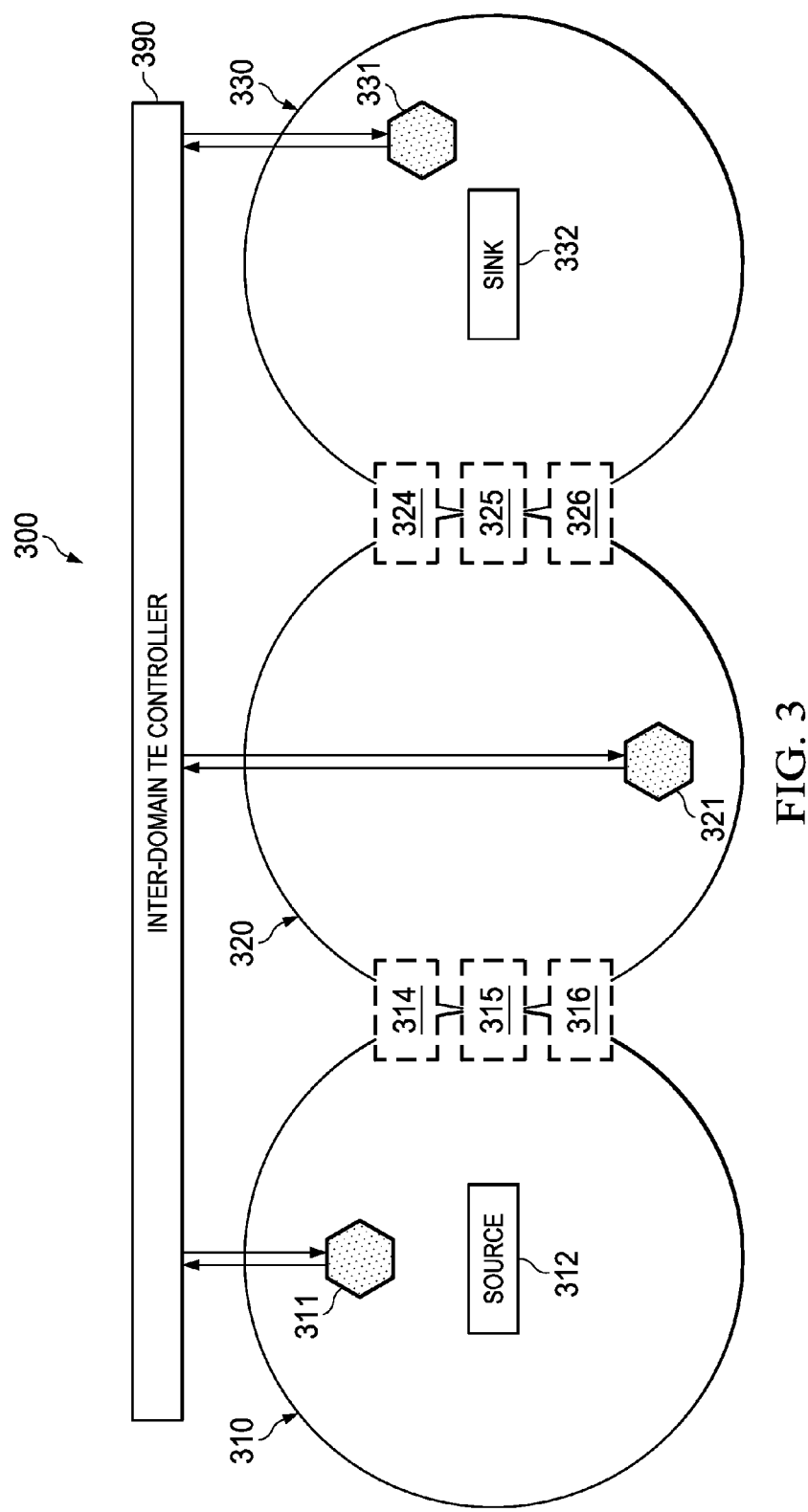
FIG. 3 illustrates a diagram of an embodiment multi-domain SDN architecture.

Aspects of this disclosure constrain resource provisioning of domain controllers based on resource requirements of remotely-originating inter-domain traffic flows. In some embodiments, inter-domain allocation constraints are computed by a centralized inter-domain controller. FIG. 3 illustrates an embodiment multi-domain SDN network 300 comprising domains 310, 320, 330 in which resource provisioning is managed by domain controllers 311, 321, 331. As shown, the domain 310 is connected to the domain 320 by inter-domain links 314, 315, 316, while the domain 320 is connected to the domain 330 by inter-domain links 324, 325, 326. The domain controllers 311, 321, 331 report to an inter-domain TE controller 390, which may be an SDN controller responsible for coordinating provisioning between the domain controllers 311, 321, 331. The inter-domain TE controller 390 may compute inter-domain allocation constraints based on border element information reported by the domain controllers 311, 321, 331. The inter-domain TE controller 390 may then send the inter-domain allocation constraints to the domain controllers 311, 321, 331, where they will be used for traffic engineering within the specific domains. In some embodiments, the inter-domain allocation constraints may specify a portion of inter-domain link capacity that is reserved for carrying inter-domain traffic originating from outside the first domain. By way of example, inter-domain allocation constraints sent to the domain controller 321 may reserve a portion (e.g., twenty percent, thirty percent, etc.) of link capacity over one or more of the inter-domain link 324-326 for traffic originating from outside the domain 320, e.g., from the source 312 in the domain 310, etc. In other embodiments, the inter-domain allocation constraints specify a minimum throughput rate to be maintained for remotely-originating traffic. In yet other embodiments, the inter-domain allocation constraints specify a parameter (or variable) that is input into a traffic engineering algorithm.

The inter-domain TE controller 390 may generate the inter-domain allocation constraints by solving an inter-domain TE optimization problem. The inter-domain allocation constrains may correspond to portions of link capacity reserved for remotely-generated traffic. The inter-domain TE controller 390 may send the inter-domain allocation constraints to the domain controllers 311, 321, 331, where the inter-domain allocation constraints may be used to solve local intra-domain TE optimization problems, as well as to update border element information (capacity, congestion, delay, cost, etc.) in order to synchronize border databases.

Figure 4:
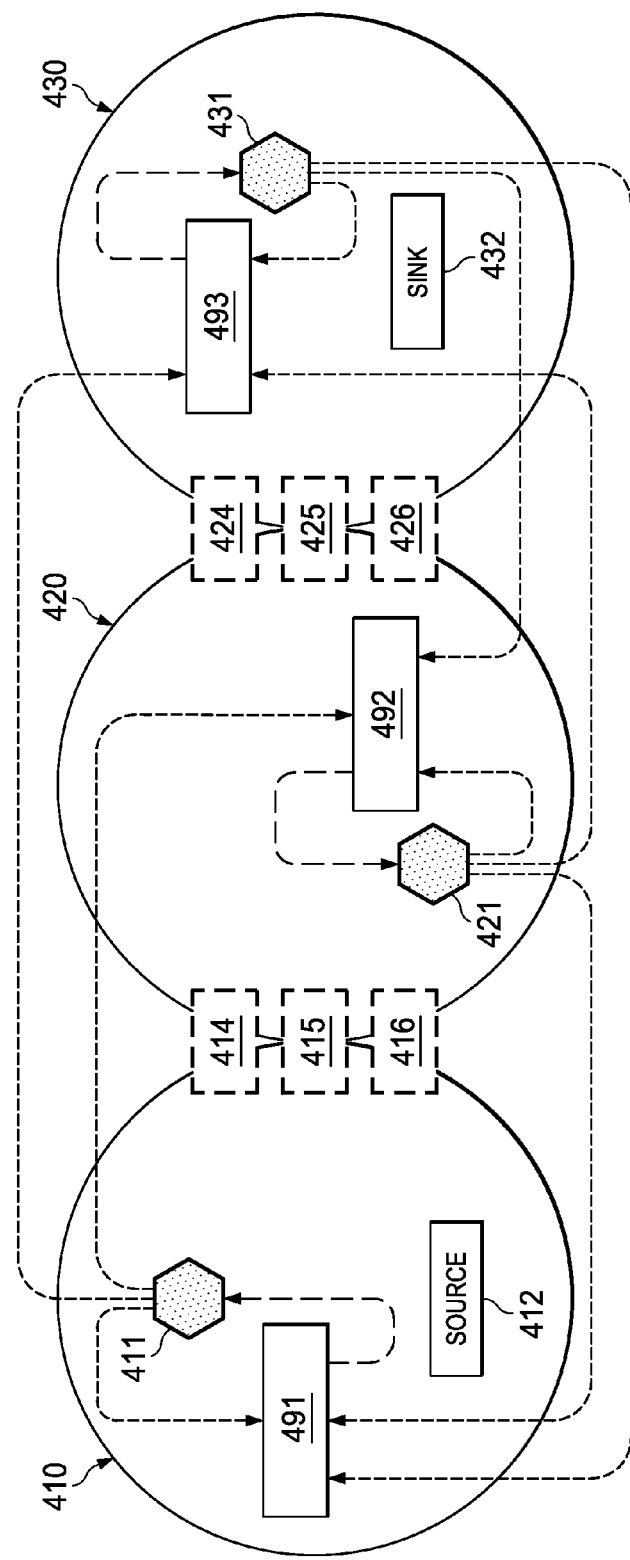
FIG. 4 illustrates a diagram of another embodiment multi-domain SDN architecture.

In other embodiments, inter-domain allocation constraints are computed by distributed inter-domain controllers. FIG. 4 illustrates an embodiment multi-domain SDN network 400 comprising domains 410, 420, 430 in which resource provisioning is managed by domain controllers 411, 421, 431. As shown, the domain 410 is connected to the domain 420 by inter-domain links 414, 415, 416, while the domain 420 is connected to the domain 430 by inter-domain links 424, 425, 426. The domain controllers 411, 421, 431 report border element information (dotted arrows) to distributed inter-domain TE controllers 491, 492, 493. The distributed inter-domain TE controllers 491, 492, 493 solve inter-domain TE optimization problems to generate the inter-domain allocation constraints, and then communicate the inter-domain allocation constraints (dashed arrows) to the respective domain controllers 411, 421, 431. Notably, each domain stores a local copy of the inter-domain TE controller in each domain and a local copy of a fully populated border database. Domain border information can be flooded between domain controllers such that each local copy of inter-domain TE controller has the full view of the border database. The distributed inter-domain TE controllers 491, 492, 493 may run the same TE algorithm for the inter-domain level network and generate identical constraints, e.g., the same share of cross-domain traffic on border elements. This distributed inter-domain TE approach may offer resiliency advantages over a centralized approach, which may be susceptible to single point failures.

In a distributed inter-domain controller scenario, inter-domain TE decisions can be made without full access to border database information of remote domains. For example, distributed inter-domain TE controllers may perform distributed optimization with the geographic zoning approach, where each node in the domain topology becomes its own zone, and central coordination is not needed. The distributed inter-domain TE controllers may compute how much cross domain traffic is transported across the local border elements based on partial knowledge of the border database. In the distributed optimization process, neighboring domains may communicate to ensure their allocation for inter-domain flows on their border links are similar or identical, and the end points of inter-domain flows may communicate to coordinate flows.

Figure 5:
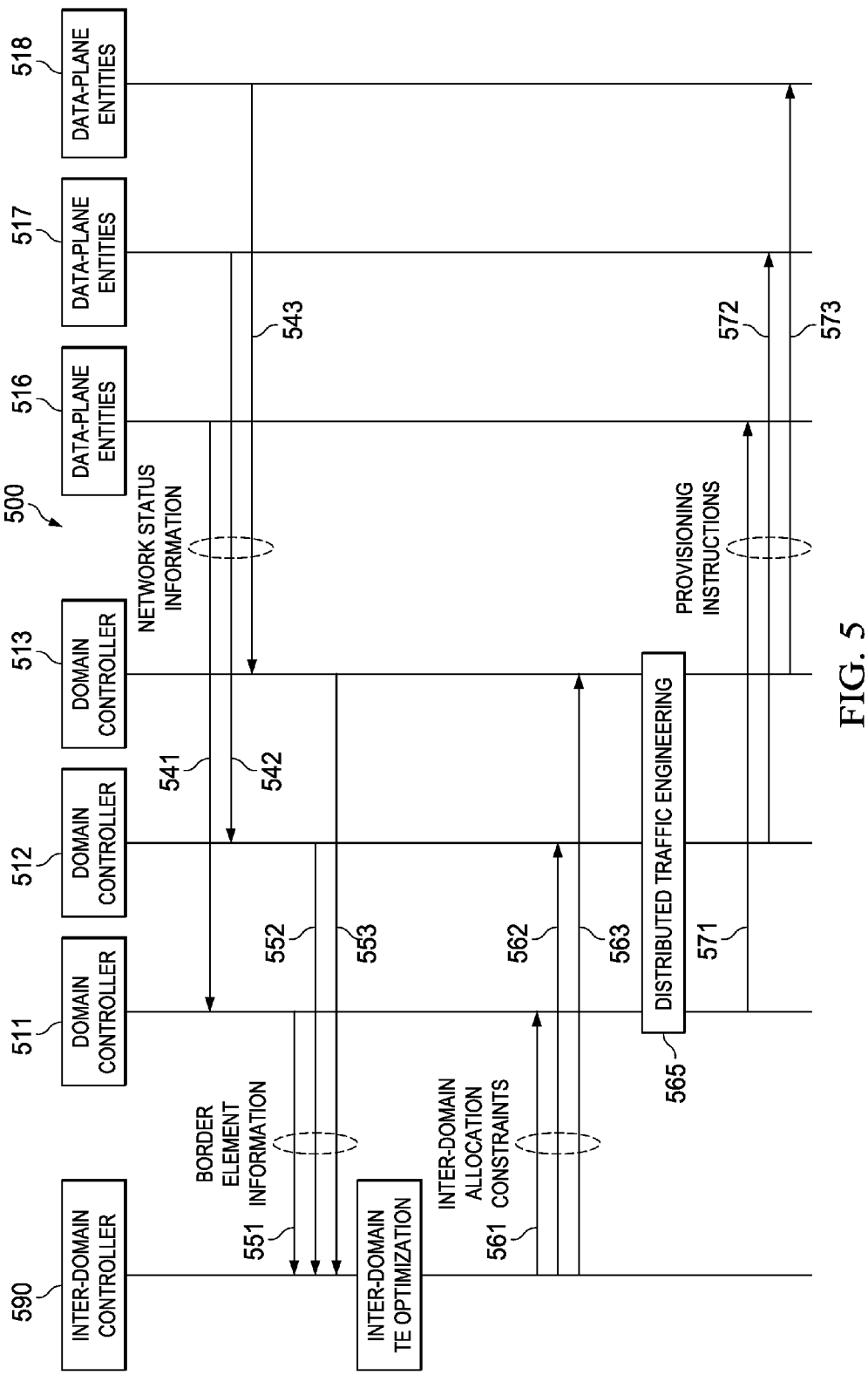
FIG. 5 illustrates a protocol diagram of an embodiment communications sequence between SDN controllers for achieving inter-domain traffic engineering.

FIG. 5 illustrates a communications sequence 500 for performing inter-domain TE in multi-domain SDN architecture. As shown, the communications sequence 500 takes place between a plurality of data-plane entities 516, 517, 518, a plurality of domain controllers 511, 512, 513, and an inter-domain TE controller 590. The domain controllers 511, 512, 513 may be SDN controllers assigned to perform resource provisioning in domains of the multi-domain SDN architecture. The data-plane entities 516, 517, 518 may correspond to network nodes (e.g., edge, core, or otherwise) positioned in domains assigned to the domain controllers 511, 512, 513 (respectively). The inter-domain TE controller 590 may be any centralized or distributed controller configured to coordinate distributed traffic engineering in the various domains of the multi-domain SDN architecture.

As shown, the communications sequence 500 begins when the data-plane entities 516, 517, 518 report network status information 541, 542, 543 to the domain controllers 511, 512, 513. The network status information 541, 542, 543 may include control information that allows the domain controllers 511, 512, 513 to predict or project future resource requirements for traffic flows originating from inside their domains. The domain controllers 511, 512, 513 may consolidate the network status information 541, 542, 543 into border element information 551, 552, 553, which may be sent to the inter-domain TE controller 590. The border element information 551, 552, 553 may specify various control information relevant to inter-domain traffic flows and/or resource provisioning. For example, the border element information 551, 552, 553 may specify a load/resource requirement, quality of service (QoS) requirement, source/destination address, and other parameters for a given inter-domain flow. The inter-domain TE controller 590 may use the border element information 551, 552, 553 to compute inter-domain allocation constraints 561, 562, 563. The inter-domain allocation constraints 561, 562, 563 are then forwarded to the domain controllers 511, 512, 513, where they are used for distributed traffic engineering in the domains. More specifically, the inter-domain allocation constraints 561, 562, 563 serve to constrain or limit resource provisioning in the respective domains to ensure that resource requirements of remotely-originating inter-domain traffic are satisfied. The domain controllers 511, 512, 513 generate provisioning instructions 571, 572, 573 during the distributed traffic engineering, which are forwarded to the data-plane entities 516, 517, 518. The provisioning instructions 571, 572, 573 may correspond to any control instruction that affects forwarding of traffic over the data-plane. For example, the provisioning instructions 571, 572, 573 may instruct the data-plane entities 516, 517, 518 to write, or remove, entries from their respective forwarding tables.

Figure 6:
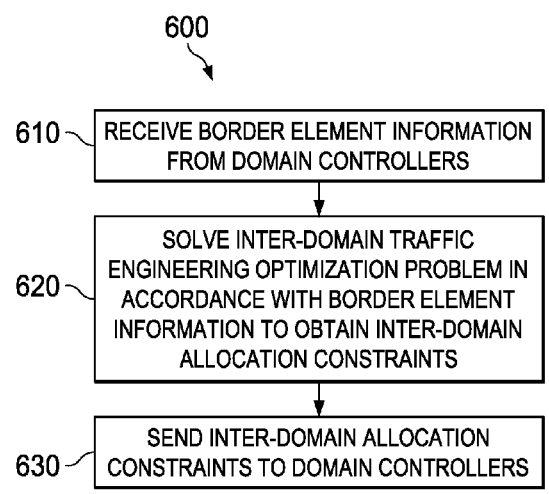
FIG. 6 illustrates a flow chart of an embodiment method for computing inter-domain allocation constrains.

Aspects of this disclosure provide methods for computing inter-domain allocation constraints. FIG. 6 illustrates a method 600 for computing inter-domain allocation constrains, as might be performed by a centralized or distributed inter-domain TE controller. As shown, the method 600 begins with step 610, where the inter-domain TE controller receives border element information from domain controllers. Thereafter, the method 600 proceeds to step 620, where the inter-domain TE controller solves an inter-domain traffic engineering optimization problem in accordance with the border element information to obtain inter-domain allocation constraints. Next, the method 600 proceeds to step 630, where the inter-domain TE controller sends the inter-domain allocation constraints to the domain controllers, which use the constraints to perform resource provisioning in the respective domains.

Aspects of this disclosure provide methods for provisioning resources in accordance with inter-domain allocation constraints. FIG. 7 illustrates a method 700 for provisioning resources in accordance with inter-domain allocation constraints, as might be performed by a domain controller. As shown, the method 700 begins with step 710, where the domain controller collects network status information from data-plane elements. Next, the method 700 proceeds to step 720, where the domain controller computes border element information in accordance with the network status information. In some embodiments, the border element information may be obtained by consolidating (or otherwise condensing) the network status information into information pertaining to locally-originating inter-domain traffic. Subsequently, the method 700 proceeds to step 730, where the domain controller sends the border element information to one or more inter-domain controllers. In one embodiment, the border element information is sent to a centralized inter-domain controller. In another embodiment, the border element information is sent to multiple distributed inter-domain controllers. Next, the method 700 proceeds to step 740, where the domain controller receives inter-domain allocation constraints from the inter-domain controller. Thereafter, the method 700 proceeds to step 750, where the domain controller solves an intra-domain optimization problem/algorithm in accordance with the inter-domain allocation constraints. Finally, the method 700 proceeds to step 760, where the domain controller communicates provisioning instructions to the data-plane elements in the controller's assigned domain.

Aspects of this disclosure provide an inter-domain traffic engineering optimization problem, which may be used by SDN controllers to compute inter-domain allocation constraints. More specifically, Inter-domain allocation constraints can be obtained by solving an inter-domain TE optimization problem in accordance with border element information and a domain reachability graph. The inter-domain allocation constraints can then be used by the domain controllers to perform intra-domain traffic engineering optimizations. During inter-domain TE optimization, the sum-utility of inter-domain traffic flows can be maximized. If an inter-domain traffic flow has a rate demand, the demand can be used as allocation upper bound to prevent over-provisioning. The demand can be obtained, for example, from an inter-domain flow rate monitor component, which may model flows targeting the same destination domain as a single inter-domain flow and sample their rates over time to get rate statistics. The following is an embodiment inter-domain TE optimization problem:

$$\max \sum_{c_k \in \mathcal{K}} U_k(x_k(k))$$

$$\sum_{a_j \in N_i^+} x_j(k) - \sum_{a_j \in N_i^-} x_j(k) = 0, n_i \in \mathcal{N}_T, c_k \in \mathcal{K}$$

$$\sum_{k=1}^{K} x_j(k) \le C_j, a_j \in \mathcal{A}_{OPT}$$

$$x_j(k) \ge 0, a_j \in \mathcal{A}_{OPT}, c_k \in \mathcal{K}.$$

where $x_j(k)$ are the variables corresponding to the solution of the optimization, which correspond to the rate allocated to flow k on link j in the domain level network. A flow corresponds to the pair of source destination domains. The objective function minimizes the sum of utilities of the allocated rates to pairs of domains. The first constraint ensures rates allocated to traffic entering and leaving a domain are equal. The second constraint ensures that the allocated traffic does not exceed the rates of the border links between the domains. The optimization can be done on a modified graph, where each source and destination pair domains k are assigned a virtual link which results up with an allocated rate $x_k(k)$, corresponding to the end-to-end rate allocated to the source-destination pair.

The first constraint is flow conservation constraint for traffic entering and exiting a domain. The resulting domain-level end-to-end allocations $(x_j(k), k=1, \ldots K$ becomes demand/restriction for intra-domain TE for all source-destination domain pairs k, traversing the inter-domain link j. The hierarchical design can be implemented in different ways, depending on how/where the inter-domain TE optimization is performed.

Figure 8:
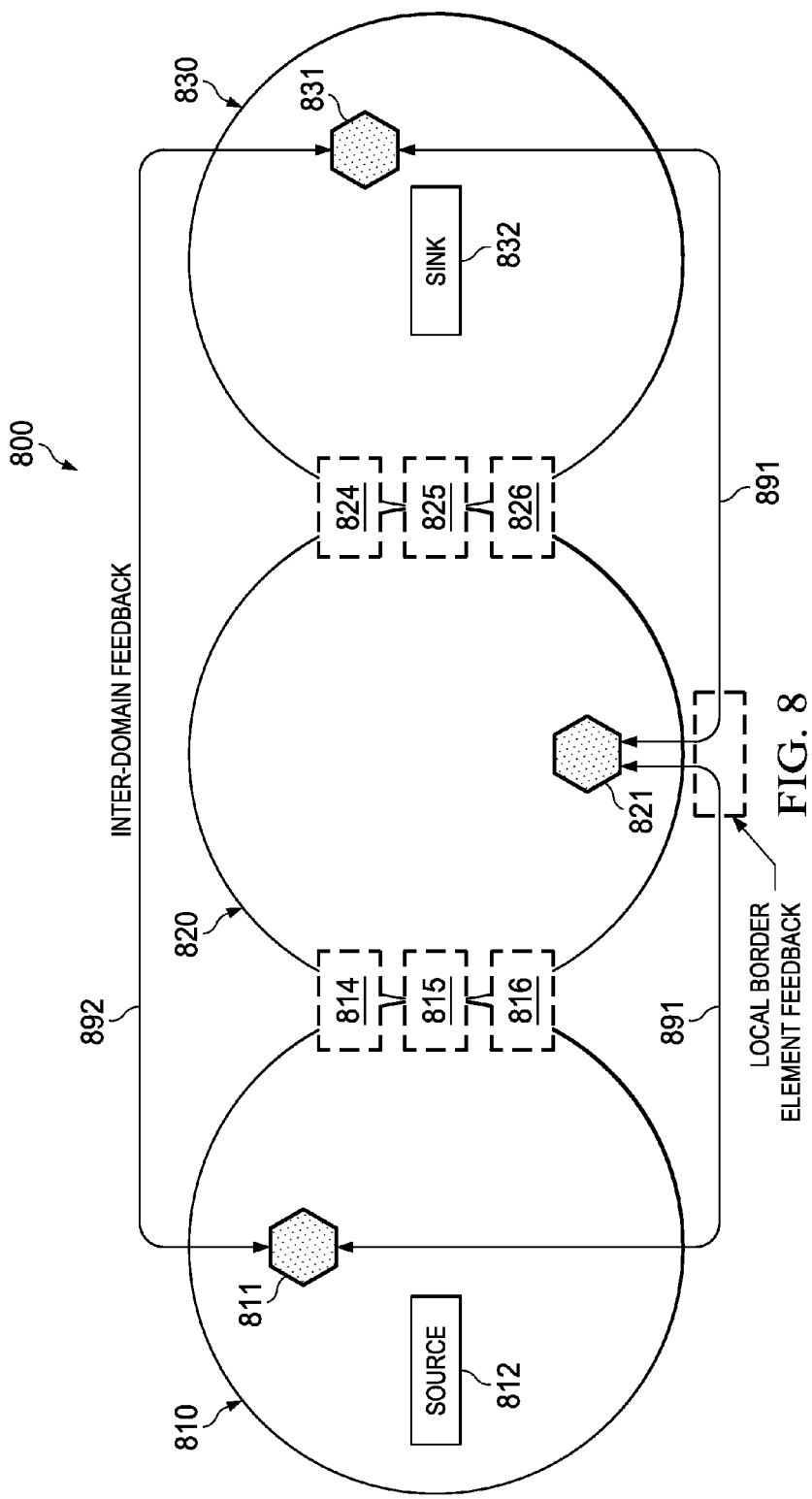
FIG. 8 illustrates a diagram of yet another embodiment multi-domain SDN architecture.

In some embodiments, inter-domain allocation constraints are computed by the domain controllers in a distributed fashion. FIG. 8 illustrates an embodiment multi-domain SDN network 800 comprising domains 810, 820, 830 in which resource provisioning is managed by domain controllers 811, 821, 831. As shown, the domain 810 is connected to the domain 820 by inter-domain links 814, 815, 816, while the domain 820 is connected to the domain 830 by inter-domain links 824, 825, 826. The domain controllers 811, 821, 831 compute inter-domain allocation constraints by communication local border element feedback 891 with neighboring domain controllers, as well as by communicating inter-domain feedback 892 between domains housing a source and destination node for an inter-domain traffic flow.

Distributed inter-domain TE optimization may involve multiple iterations before provisioning decisions reach convergence. Consider an arbitrary domain m. In iteration, the local inter-domain controller of m exchanges rate allocations for inter-domain traffic on local border elements with neighboring domains and calculates the weights to be given to each inter-domain traffic flow on the incoming and outgoing local border elements. The weights calculate the gradient across the shared network element in distributed optimization. It finally solves the following local version of inter-domain TE optimization for domain m in the domain-level topology. The following is an embodiment inter-domain TE optimization problem:

$$\min \sum_{c_k \in \mathcal{K}_m} U_k(x_k(k)) + \sum_{a_j \in \mathcal{N}_m^+} \lambda_m(k) x_m(k) - \sum_{a_j \in \mathcal{N}_m^-} \lambda_m(k) x_j(k)$$

$$\sum_{a_j \in \mathcal{N}_m^+} x_j(k) - \sum_{a_j \in \mathcal{N}_m^-} x_j(k) = 0, c_k \in \mathcal{K}$$

$$\sum_{k=1}^{K} x_j(k) \le C_j, a_j \in \mathcal{N}_m^+, c_k \in \mathcal{K}$$

$$\sum_{k=1}^{K} x_i(k) \le C_i, a_i \in \mathcal{N}_m^-, c_k \in \mathcal{K}$$

$$x_j(k) \ge 0, a_j \in \mathcal{N}_m^- \cup \mathcal{N}_m^+, c_k \in \mathcal{K}$$

where $x_j(k)$ are the variables corresponding to the solution of the optimization, which correspond to the rate allocated to flow k on link j in the domain level network. A flow corresponds to the pair of source destination domains. The objective function minimizes the sum of utilities of the allocated rates to pairs of domains and includes the weights obtained from a Lagrangian decomposition: $\lambda_m(k)$ is the Lagrangian variable which corresponds to the cost of assigning rate of $x_m(k)$ bits-per-second to inter-domain traffic pair k on border link m. This cost can be the queuing delay on the border link, for example. The first constraint ensures rates allocated to traffic entering and leaving a domain are equal. The second and third constraints ensure that the allocated traffic does not exceed the rates of the border links between the domains. The optimization can be done on a modified graph, where each source and destination pair domains k are assigned a virtual link which results up with an allocated rate $x_k(k)$, corresponding to the end-to-end rate allocated to the source-destination pair.

Figure 9A:
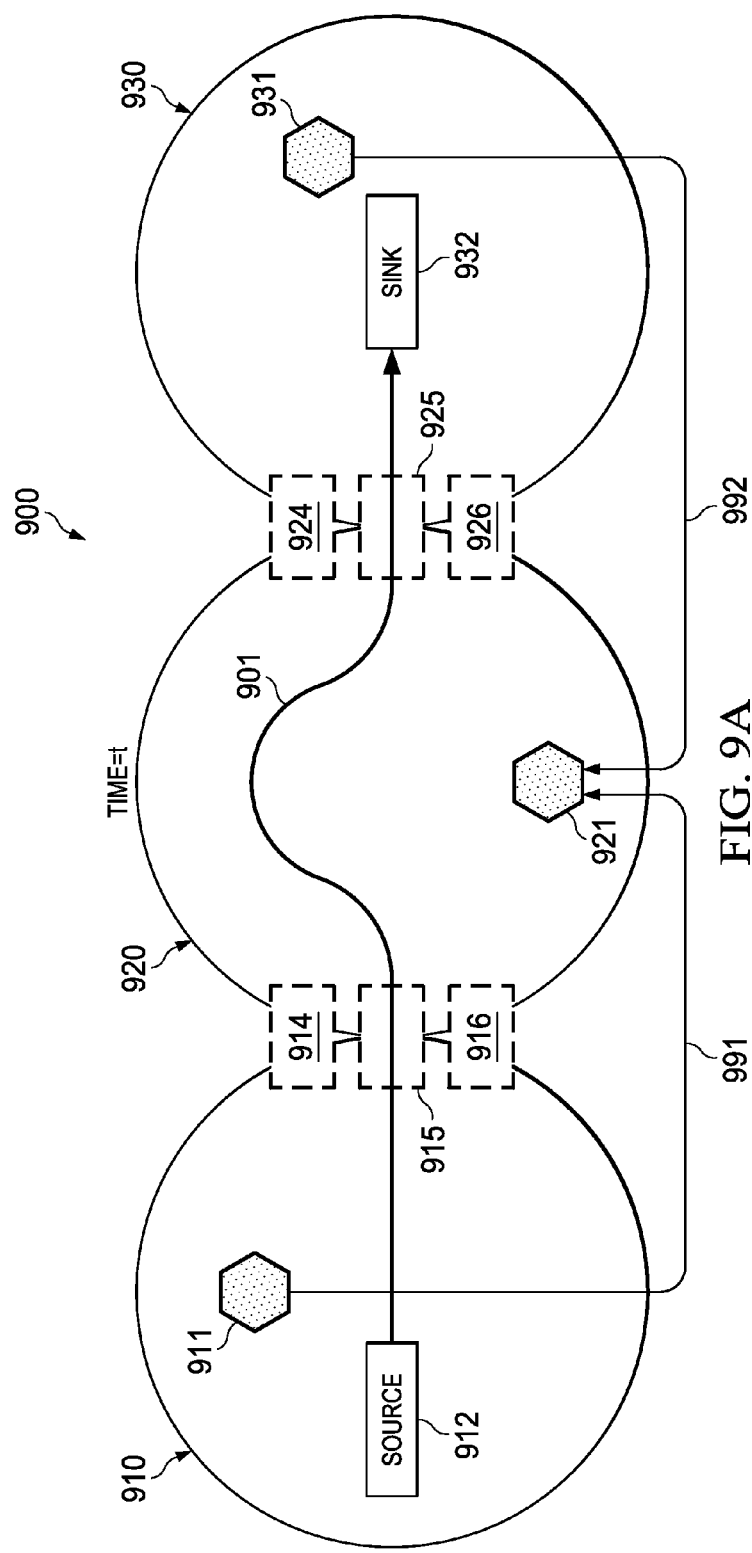
FIGS. 9A-9C illustrate diagrams of yet another embodiment multi-domain SDN architecture.
Figure 9B:
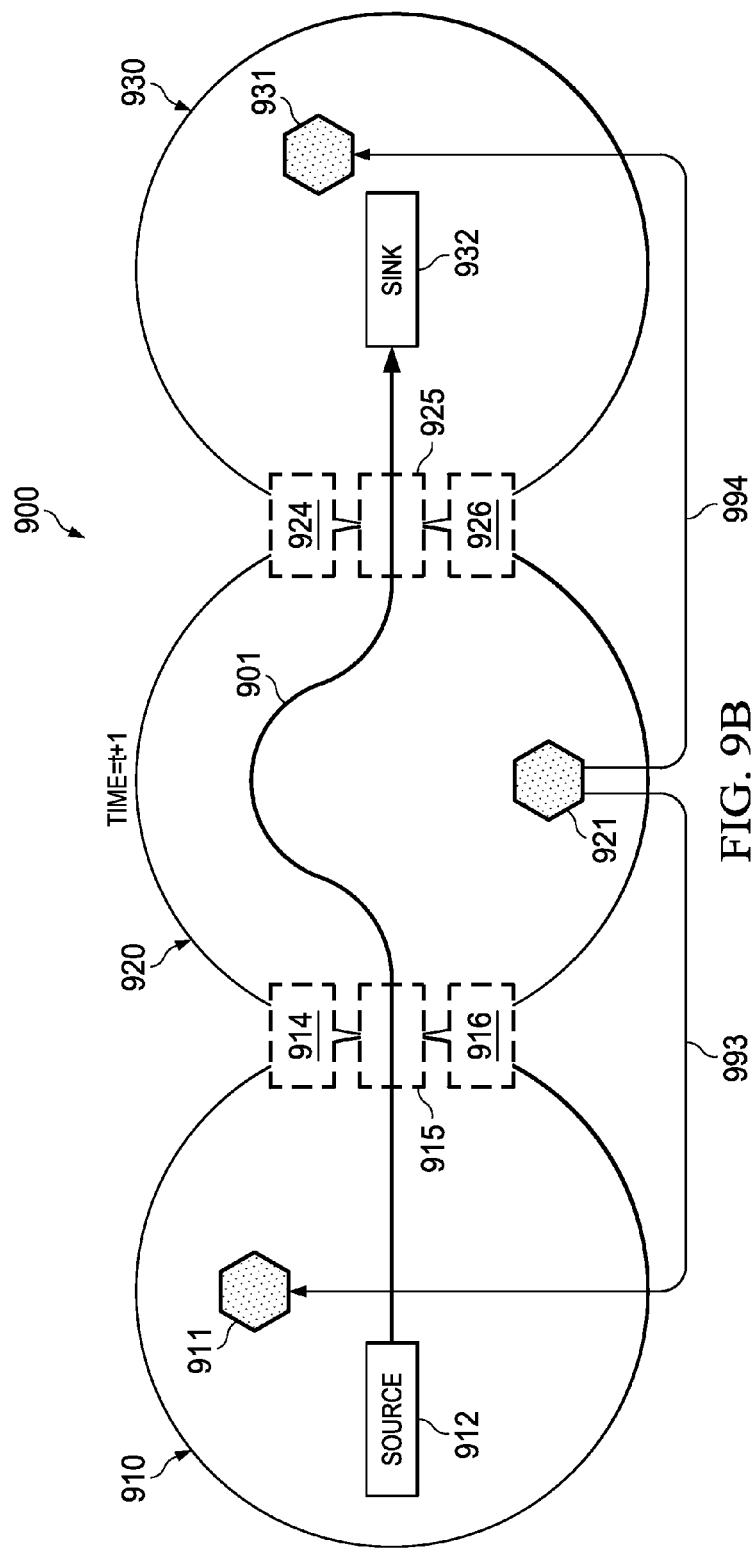
Figure 9C:
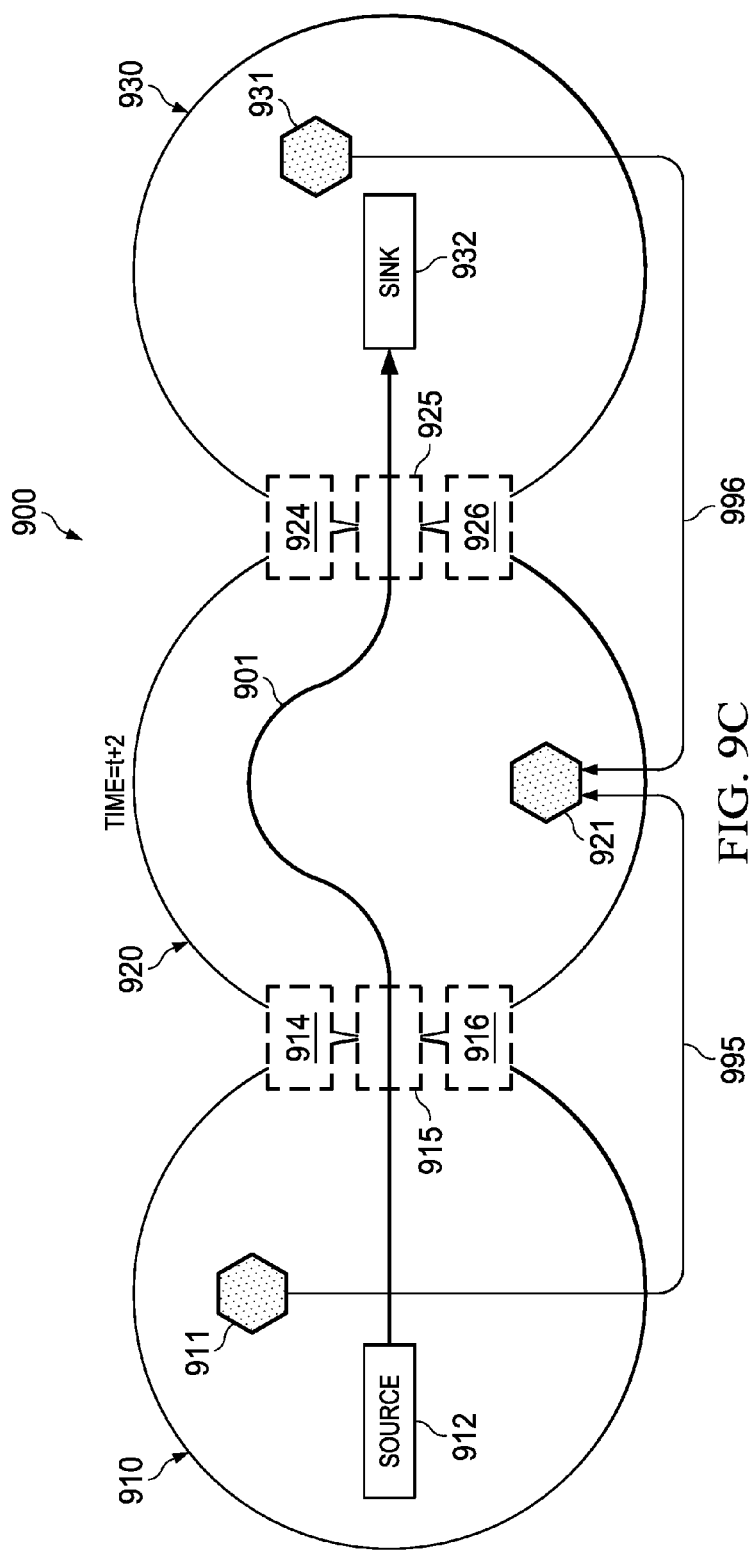

In some embodiments, domain controllers compute the inter-domain allocation constraints in an iterative fashion. FIGS. 9A-9C illustrate an embodiment network 900 in which a plurality of domain controllers 911, 921, 931 iteratively compute inter-domain allocation constraints for an inter-domain path extending from a source 912 to a sink 932 over three intervals. As shown in FIG. 9A, the domain controllers 911, 931 communicate border router element information 991, 992 to the domain controller 921 during a first interval (e.g., time=t). In one example, the border router element information 991 corresponds to a rate demand for a traffic flow originating from the source 912, while the border router element information 992 corresponds to a rate limit for transporting the traffic flow through the domain 930. Upon receiving the border router element information 991, 992, the domain controller 921 may solve a local traffic engineering optimization problem that updates a border element database. The domain controller 921 may then send updated border element information 993, 994 to the domain controllers 911, 931 during a second interval (e.g., time=t+1), which is shown in FIG. 9B. The domain controllers 911, 931 may solve a local traffic engineering optimization problem using the updated border element information 993, 994, which even further updates the border element databases in the domains 910, 930. These updates may be communicated from the domain controllers 911, 931 to the domain controller 921 via updated border element information 995, 996 at a third interval (e.g., time=t+2), which is shown in FIG. 9C.

Aspects of this disclosure provide methods for computing inter-domain allocation constraints in a distributed fashion. FIG. 10 illustrates a method 1000 for computing inter-domain allocation constraints in a distributed fashion, as might be performed by a domain controller. As shown, the method 1000 starts at step 1010, where the domain controller receives border element updates from neighboring domain controllers. Thereafter, the method 1000 proceeds to step 1020, where the domain controller collects network status information from data-plane elements. Subsequently, the method 1000 proceeds to step 1030, where the domain controller solves a local traffic engineering optimization problem to update border element database. Next, the method 1000 reverts back to step 1040, where the domain controller communicates border element updates to neighboring domain controllers. Subsequently, the method 1000 reverts back to step 1010, where the next set of inter-domain allocation constraints are computed.

Figure 11:
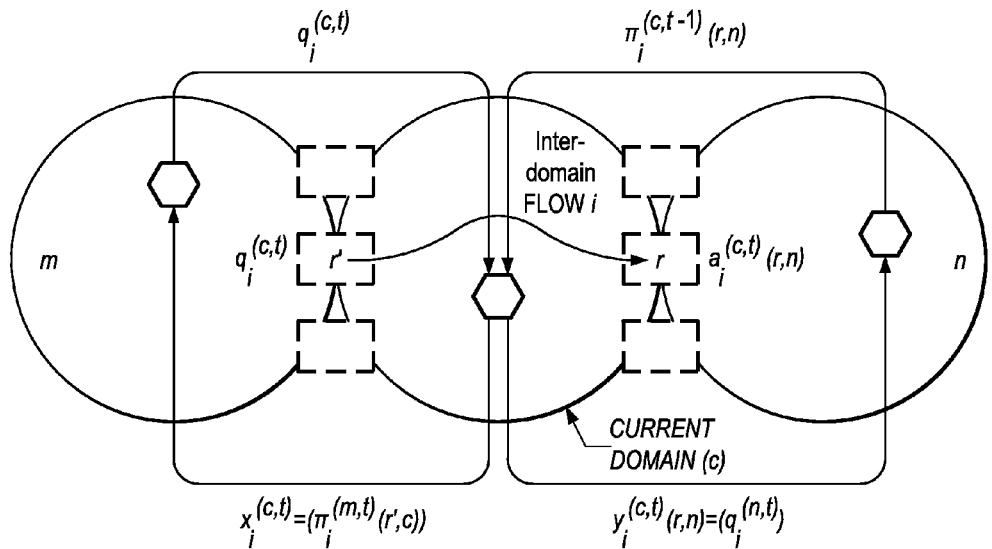
FIG. 11 illustrates a diagram of yet another embodiment multi-domain SDN architecture.

FIG. 11 illustrates another embodiment network in which domain controllers iteratively compute inter-domain allocation constraints for an inter-domain path extending through multiple domains. In this example, each domain TE controller performs TE optimization jointly for intra-domain and the local portion of inter-domain traffic in each domain. Domain TE optimization handles inter-domain flows according to supported rates by downstream domains, e.g., historical rates, etc. Each domain along the path notifies the immediate upstream domains of an inter-domain flow about its TE provisioning (or provisioning gap) to the flow. Each domain also notifies the immediate downstream domains about its rate support to the inter-domain flow. Inter-domain traffic is satisfied at maximum in a domain-by-domain fashion, subject to local domain traffic and domain TE optimization objectives.

Generally speaking, domain controllers may be unaware of the internal topology of other domains, but may maintain information about the reachability of other domains, e.g., knowledge about the inter-domain links, etc. In some embodiments, a domain controller may maintain reachability information of the entire network in a full reachability graph. In other embodiments, a domain controller may maintain reachability information of next hop domains (e.g., direct neighbors of the assigned domain) in reachability sub-graph or a neighbourhood graph. The reachability graphs may be pre-configured, informed by a center controller, or established by discovery messages exchanged between domains, e.g., using board gateway protocols, etc.

Figure 13:
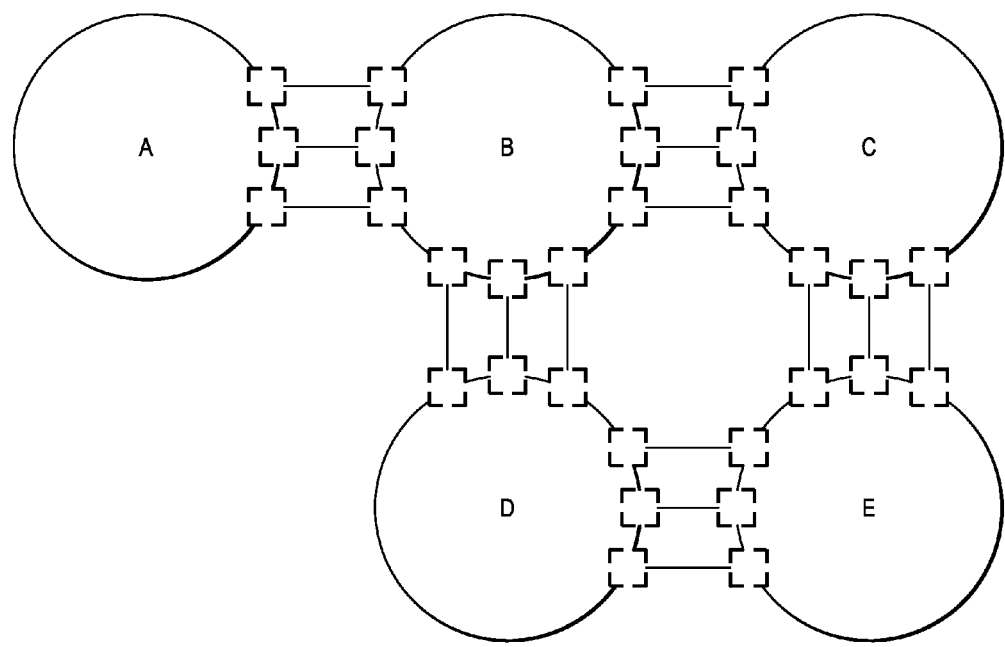
FIG. 13 illustrates a diagram of an embodiment reachability graph.
Figure 14:
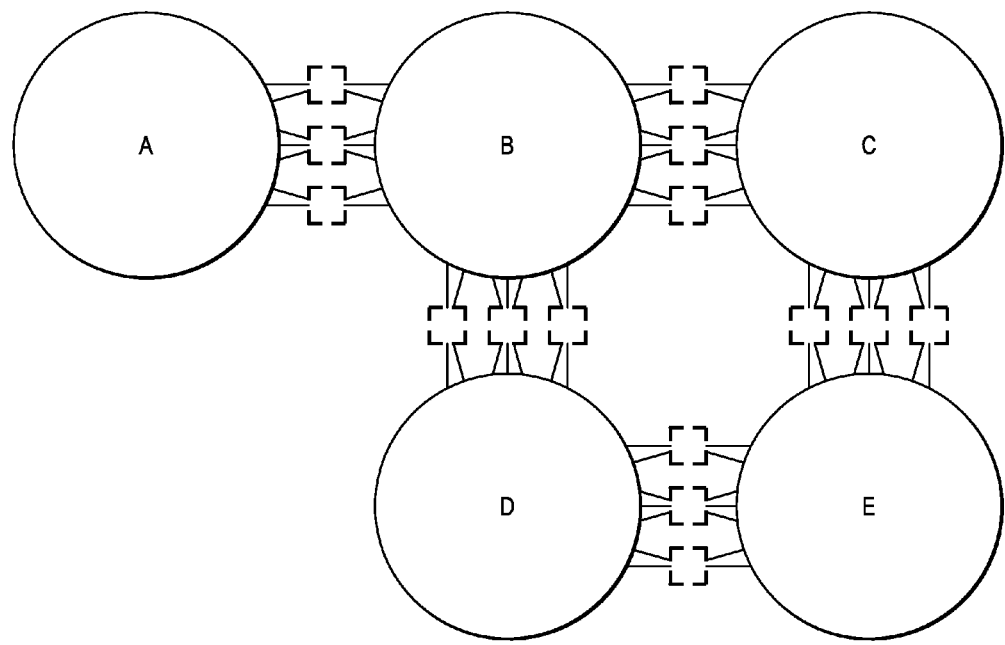
FIG. 14 illustrates a diagram of another embodiment reachability graph.

Reachability graphs may model inter-domain connections using a link-based border or node-based border. FIG. 13 illustrates an embodiment reachability graph that models inter-domain connections using a link-based border. FIG. 14 illustrates an embodiment reachability graph that models inter-domain connections using a node-based border. For purposes of brevity, the term "inter-domain links" is used herein to refer to both link-based and node-based borders. A global border is a set of network elements connecting domains together. A local domain border is a segment of the global border, which links a local domain to the other domains. Border resources can be shared among domains. Each domain may be assigned a domain controller that allocates its internal network resources and ensures that allocations/constraints of border resources are respected.

A domain controller typically has full knowledge of local intra-domain traffic and locally originated inter-domain traffic, and partial knowledge on inter-domain traffic that terminates in or across itself. Domain controller may not know exact sets of traffic flows in other domains, even for flows that pass through its assigned domain (e.g., pass-through inter-domain traffic). A domain controller may view inter-domain traffic flows passing through the domain as a local intra-domain flow by taking the border elements through which the flow enters as local source and the border elements through which the flow leaves collectively as local destination. Local destinations can be determined from the flow's domain-level routing paths, which can be embedded in the flow (source routing) or calculated locally according to domain reachability graph and certain domain-level routing principle. Intra-domain flows with the same source and destination and with similar QoE/S requirements can be aggregated.

Figure 15:
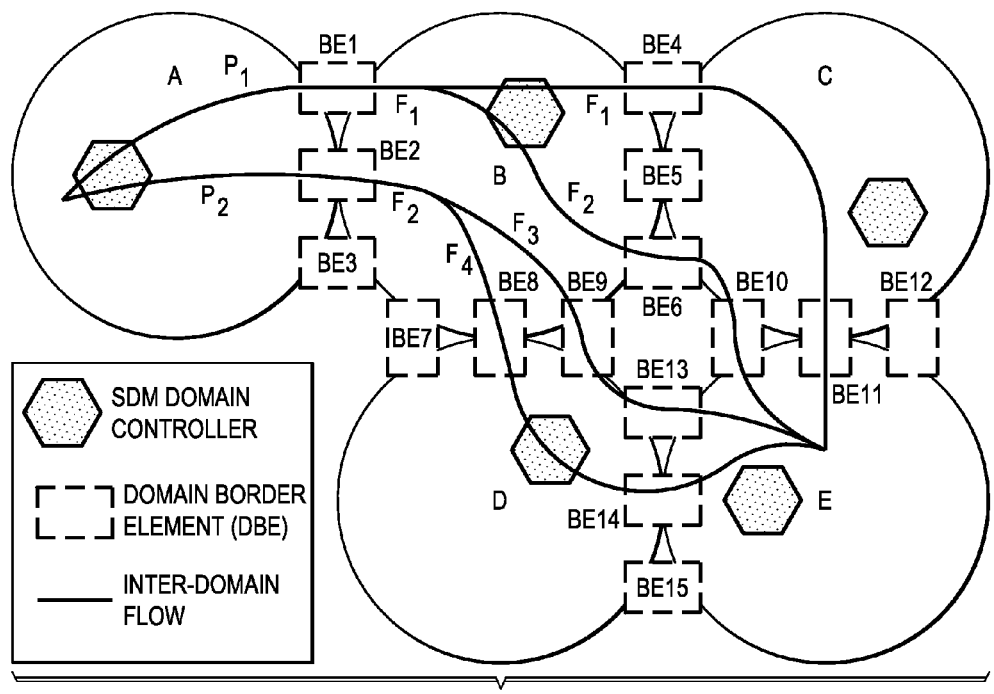
FIG. 15 illustrates a diagram of an embodiment inter-domain traffic flow extending through a multi-domain SDN architecture.

FIG. 15 illustrates an inter-domain flow that is communicated from domain A and to domain E. The inter-domain flow is transported over two domain paths, namely a first domain path (P1) <A-B-C-E> and a second domain path (P2) <A-B-D-E>. In domain B, the domain controller (shaded) views the inter-domain flow as two individual flows F1 and F2 coming from two border elements BE1 and BE2 (respectively), both having C and D as next-hop domain, and being destined for domain E. By traffic engineering, the domain controller (shaded) separates the two flows F1 and F2 into four intra-domain flows f1, f2, f3, f4. The intra-domain flows f1 and f2 have a local source BE1 and local destinations BE4 and BE6, while the intra-domain flows f3 and f4 have a local source BE2 and local destinations BE8 and BE9.

In embodiments, border databases may be referenced when performing traffic engineering optimization. Border databases may store various information used for performing inter-domain traffic engineering, and may track topology, status and resource reservation decisions between domains. Border databases may include domain-level topology information (domain reachability graph, domain reachability sub-graphs, neighborhood graphs, etc.) and domain distance information (e.g., number of hops (or some other cost metric) associated with inter-domain paths). Border databases may also include traffic demand information between pairs of neighboring domains, such as the amount of traffic being communicated from one neighboring domain to another neighboring domain via the instant domain. Border databases may also include border element capacity information specifying a maximum supported rate on a border element (e.g. capacity of a physical link), as well as a maximum rate that can be used on a border element for traffic travelling between and/or toward an end domain. Moreover, border databases may include inter-domain link information, such as maximum rate supported on a link, a link classification (e.g., wireless, wireline, scheduled, contention-based, etc.), link delay characteristics (e.g., effective capacity due to retransmissions), etc. Border databases may also include path inter-domain path information (e.g., border database for domain B may include information for path P1 or P2), which may specify a quality of service on paths between domains through a border element, congestion information related to a path (delay, queue wait time, maximum delay on a segment), minimum/maximum rate provided on the path, and information about path splitting as the path crosses different domains (explicit information, delay jitter, etc.). Border databases may also include border element cost information relating to a cost for transporting traffic over border elements between domains. Border element cost information may include a price (e.g., in dollars) for transporting the traffic over the border element. Border element cost information may include a congestion cost/price for using the border element, or a congestion cost/price for using paths interconnecting the border element to an end/destination domain.

Figure 16:
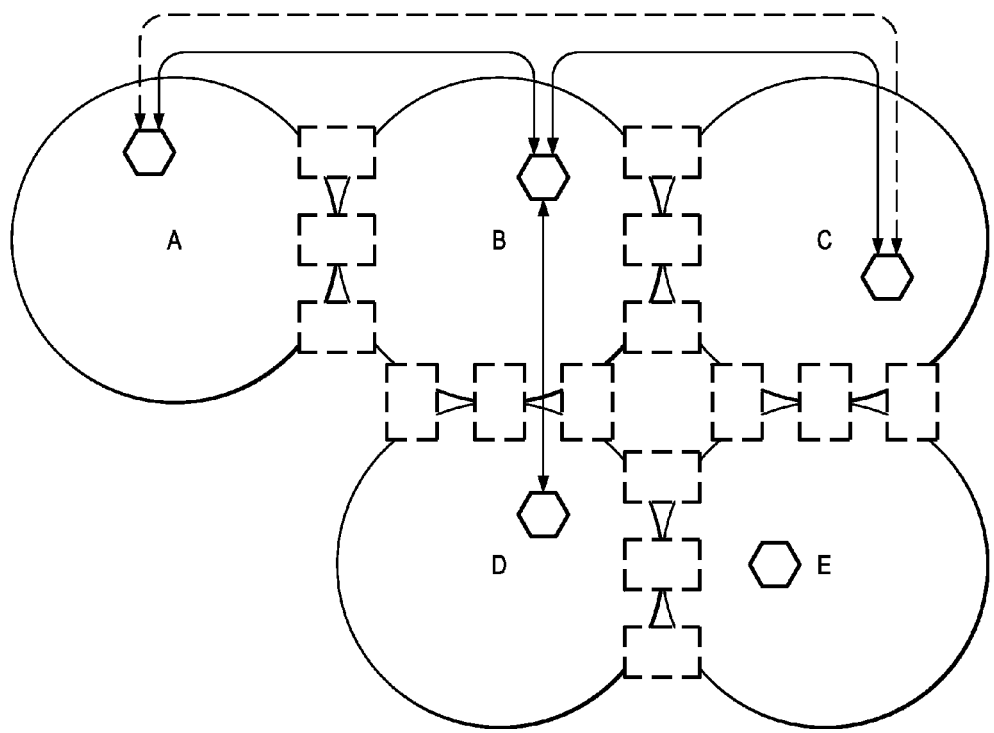
FIG. 16 illustrates a diagram of an embodiment border database information exchange sequence in a multi-domain SDN architecture.

A border database may be located at a central location or distributed amongst multiple locations, and may be fully or partially populated. When distributed border databases are located on or near domain controllers, domain controllers may populate the database in various ways. In one example, the domain controller can report their local border database information to a central controller, which can distribute the information to other domain controllers. The central controller may process the information prior to distribution. Alternatively, the central controller may distribute the raw data without processing. In another example, the domain controllers may exchange their local border database information in a distributed fashion, as shown in FIG. 16. In some embodiments, the border database information is flooded to each domain controller in a network. In other embodiments, the border database information is exchanged only among neighboring controllers or controllers within a threshold number of domain hops, e.g., domains that are within X-domains of the instant domain.

Figure 12:
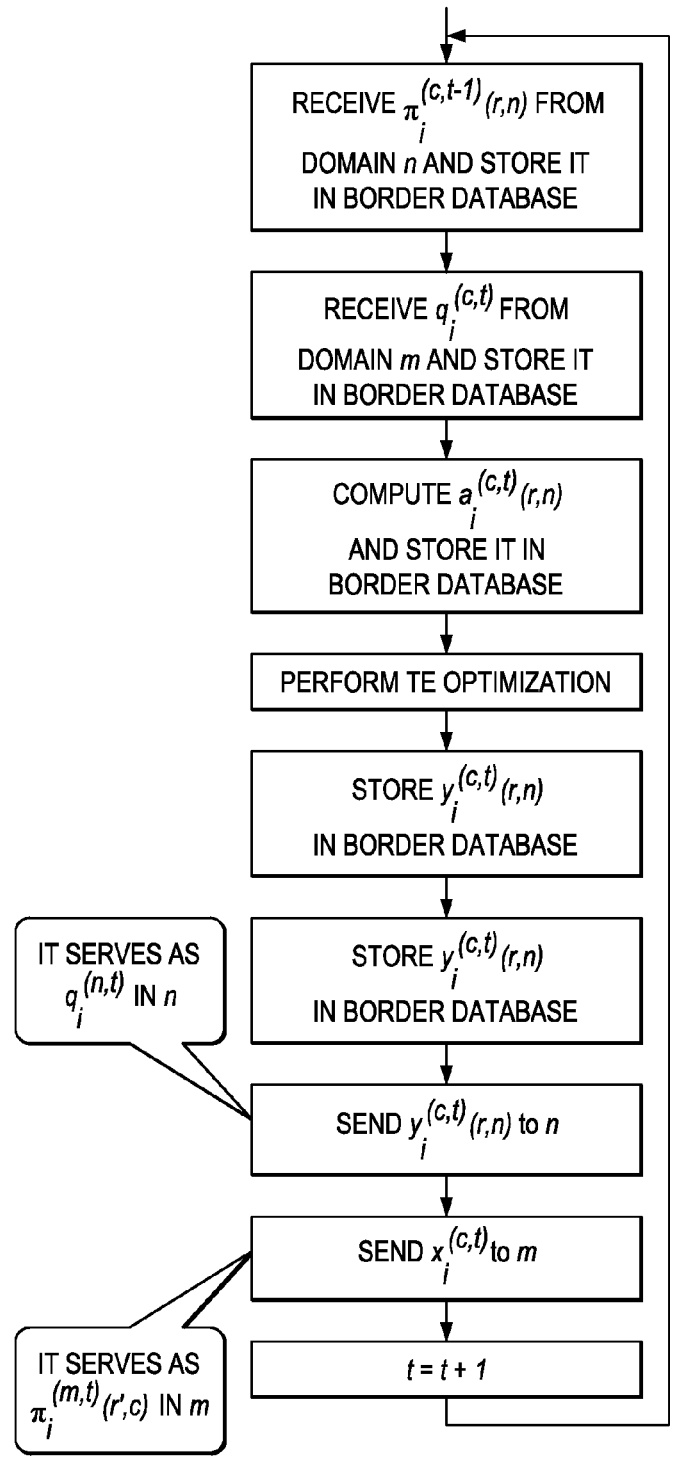
FIG. 12 illustrates a flow chart of an embodiment method for solving a distributed inter-domain TE optimization algorithm.

The following is an embodiment inter-domain TE optimization problem being solved in a domain (c) at an iteration (t):

$$\max \sum_{i \in F} U(x_i^{(c)}), \quad \begin{aligned} & x_i^{(c,t)} \leq q_i^{(c,t)}, \forall i \in F_c^{inter} \\ & y_i^{(c,t)}(r,n) \leq a_i^{(c,t)}(r,n), \forall i \in F_c^{inter} \end{aligned},$$

$$\text{where } \max \sum_{i \in F} U(x_i^{(c)})$$

is subject to TE optimization constraints, $x_i^{(c,t)}$ (decision variable) is a rate allocation to any flow (i), $q_i^{(c,t)}$ is a rate demand of inter-domain flow (i) informed by domain (m), $y_i^{(c,t)}(r,n)$ (decision variable) is a rate allocation to inter-domain flow (i) via domain border element (DBE) (r) and domain (n), and $a_i^{(c,t)}(r,n)$ is a rate allocation limit on DBE (r) for flow (i) through next hop domain (n). Further, $a_i^{(c,t)}(r,n)$ can be defined as $a_i^{(c,t)}(r,n) = \Delta(a_i^{(c,t-1)}(r,n), y_i^{(c,t-1)}(r,n), \pi_i^{(c,t-1)}(r,n), \ldots)$, where $\pi_i^{(c,t-1)}(r,n)$ is the rate supported by domain (n) in response to $y_i^{(c,t-1)}(r,n)$ in iteration (t-1), $\Delta(\cdot)$ is an allocation limit evolution function of $y_i^{(c,t-1)}(r,n)$, $\pi_i^{(c,t-1)}(r,n)$ (as well as potentially other inputs, e.g., a Jacobi or Gauss-Seidel method of solving matrix equations for conservation of flows, etc.). A border database stores $q_i^{(c,t)}$, $a_i^{(c,t-1)}(r,n)$, $y_i^{(c,t-1)}(r,n)$, $\pi_i^{(c,t-1)}(r,n)$ and other inputs to evolution function. FIG. 12 illustrates a method for solving the algorithm discussed above.

Figure 17:
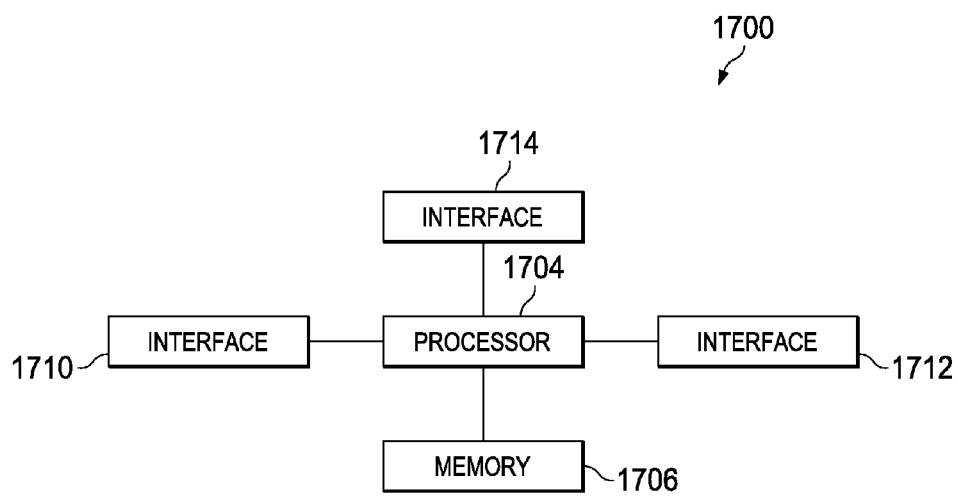
FIG. 17 illustrates a block diagram of an embodiment communications device.

FIG. 17 illustrates a block diagram of an embodiment of a communications device 1700, which may be equivalent to one or more devices (e.g., UEs, NBs, etc.) discussed above. The communications device 1700 may include a processor 1704, a memory 1706, and a plurality of interfaces 1710, 1712, 1714, which may (or may not) be arranged as shown in FIG. 17. The processor 1704 may be any component capable of performing computations and/or other processing related tasks, and the memory 1706 may be any component capable of storing programming and/or instructions for the processor 1704. The interfaces 1710, 1712, 1714 may be any components or collections of components that allows the communications device 1700 to communicate with other devices.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for resource provisioning in software defined networking (SDN) architectures, the method comprising:
   receiving, by an inter-domain traffic engineering (TE) controller, border element information from multiple SDN controllers, the multiple SDN controllers being assigned to different domains of a network;
   computing, by the inter-domain TE controller, inter-domain allocation constraints in accordance with the border element information; and
   sending, by the inter-domain TE controller, the inter-domain allocation constraints to at least a first SDN controller in the multiple SDN controllers, the first SDN controller being assigned to a first domain of the network, wherein the first domain is connected to a second domain of the network via one or more inter-domain links, and wherein the inter-domain allocation constraints are configured to reserve resources on the one or more inter-domain links for inter-domain traffic originating from outside the first domain.

2. The method of claim 1, wherein the inter-domain allocation constraints specify a portion of link capacity on the one or more inter-domain links that is reserved for carrying inter-domain traffic originating from outside the first domain.

3. The method of claim 1, wherein the inter-domain allocation constraints specify a minimum throughput rate that is required to be available for communicating inter-domain traffic originating from outside the first domain over the one or more inter-domain links.

4. The method of claim 1, wherein the inter-domain allocation constraints are configured to be used by the first SDN controller to solve an intra-domain traffic engineering optimization algorithm associated with the first domain.

5. The method of claim 1, wherein the inter-domain allocation constraints are configured to constrain resource provisioning by the first SDN controller over the one or more inter-domain links.

6. The method of claim 1, wherein the inter-domain allocation constraints are configured to at least partially restrict the communication of traffic originating from inside the first domain over the one or more inter-domain links.

7. The method of claim 1, wherein the inter-domain TE controller is a central TE controller.

8. The method of claim 1, wherein the inter-domain TE controller is a distributed TE controller assigned to one or more domains in the network.

9. A traffic inter-domain traffic engineering (TE) controller comprising:
   a processor; and
   a computer readable storage medium storing programming for execution by the processor, the programming including instructions to:
   receive border element information from multiple SDN controllers, the multiple SDN controllers being assigned to different domains of a network;
   compute inter-domain allocation constraints in accordance with the border element information; and
   send the inter-domain allocation constraints to at least a first SDN controller in the multiple SDN controllers, the first SDN controller being assigned to a first domain of the network, wherein the first domain is connected to a second domain of the network via one or more inter-domain links, and wherein the inter-domain allocation constraints are configured to reserve resources on the one or more inter-domain links for inter-domain traffic originating from outside the first domain.

10. A method for resource provisioning in software defined networking (SDN) architectures, the method comprising:
    reporting, by an SDN controller, border element information to an inter-domain traffic engineering (TE) controller, the border element information corresponding to a first domain of a network, wherein the first domain is connected to a second domain of the network via one or more inter-domain links;
    receiving, by the SDN controller, inter-domain allocation constraints from the inter-domain TE controller;
    identifying, by the SDN controller, an inter-domain resource reservation in accordance with the inter-domain allocation constraints, wherein the inter-domain resource reservation reserves resources on the one or more inter-domain links for inter-domain traffic originating from outside the first domain; and
    provisioning, by the SDN controller, resources in the first domain in accordance with the inter-domain resource reservation, wherein provisioning resources in the first domain comprises setting forwarding information databases (FIBs) in one or more border elements of the first domain, the FIB tables being set to restrict the forwarding of traffic originating from inside the first domain over the one or more inter-domain links in a manner that maintains the inter-domain resource reservation.

11. The method of claim 10, wherein the FIB tables are further set to control how remotely originating inter-domain traffic is forwarded within the first domain as well as over the one or more inter-domain links.

12. The method of claim 11, further comprising:
    computing, by the SDN controller, intra-domain resource requirements in accordance with the inter-domain allocation constraints, wherein the intra-domain resource requirements correspond to an amount of resources on intra-domain links of the first domain needed to transport remotely originating inter-domain traffic within the first domain; and
    provisioning, by the SDN controller, resources in the first domain in accordance with the intra-domain resource requirements.

13. A software defined networking (SDN) controller comprising:
a processor; and
a computer readable storage medium storing programming for execution by the processor, the programming including instructions to:
report border element information to an inter-domain traffic engineering (TE) controller, the border element information corresponding to a first domain of a network, wherein the first domain is connected to a second domain of the network via one or more inter-domain links;
receive inter-domain allocation constraints from the inter-domain TE controller;
identify an inter-domain resource reservation in accordance with the inter-domain allocation constraints, wherein the inter-domain resource reservation reserves resources on the one or more inter-domain links for inter-domain traffic originating from outside the first domain; and
provision resources in the first domain in accordance with the inter-domain resource reservation, wherein the instructions to provision resources in the first domain in accordance with the inter-domain resource reservation include instructions to set forwarding information databases (FIBs) in one or more border elements of the first domain, the FIB tables being set to restrict the forwarding of traffic originating from inside the first domain over the one or more inter-domain links in a manner that preserves the inter-domain resource reservation.

14. The SDN controller of claim 13, wherein the FIB tables are further set to control how remotely originating inter-domain traffic is forwarded within the first domain as well as over the one or more inter-domain links.

15. A method for distributed inter-domain resource provisioning in a multi-domain software defined network (SDN), the method comprising:
receiving, by an SDN controller, inter-domain rate allocation information from at least a first neighboring SDN controller, the SDN controller being assigned to a domain and the first neighboring SDN controller being assigned to a first neighboring domain, wherein the domain is connected to the first neighboring domain via one or more inter-domain links, and wherein receiving inter-domain rate allocation information comprises receiving a rate demand of an inter-domain traffic flow from the first neighboring SDN controller, the inter-domain traffic flow being communicated from the first neighboring domain to a second neighboring domain via the domain, wherein the domain is positioned in-between the first neighboring domain and the second neighboring domain;
computing, by the SDN controller, an inter-domain resource reservation in accordance with the inter-domain rate allocation information, wherein the inter-domain resource reservation reserves resources on the one or more inter-domain links for inter-domain traffic originating from outside the first domain; and
provisioning, by the SDN controller, resources in the domain in accordance with the inter-domain resource reservation.

16. The method of claim 15, further comprising:
computing, by the SDN controller, intra-domain resource requirements in accordance with the inter-domain rate allocation information, wherein the intra-domain resource requirements correspond to an amount of resources on intra-domain links of the domain needed to transport remotely originating inter-domain traffic within the domain; and
provisioning, by the SDN controller, resources in the domain in accordance with the intra-domain resource requirements.

17. The method of claim 15, wherein receiving inter-domain rate allocation information further comprises:
receiving, by the SDN controller, a rate limit for the inter-domain traffic flow from a second neighboring SDN controller assigned to the second neighboring domain.

18. The method of claim 17, wherein computing the inter-domain resource reservation in accordance with the inter-domain allocation information comprises:
computing a resource reservation for communicating the inter-domain traffic flow over the domain in accordance with the rate demand and the rate limit.

19. The method of claim 17, wherein the rate demand of the inter-domain traffic flow comprises a throughput rate required to satisfy quality of service (QoS) demands of the inter-domain traffic flow.

20. The method of claim 17, wherein the rate limit of the inter-domain traffic flow comprises a maximum throughput rate available for communicating the inter-domain traffic flow in the second neighboring domain.

21. The method of claim 17, wherein computing the inter-domain resource reservation in accordance with the inter-domain allocation information comprises:
computing a rate allocation limit $(a_i^{(c,t)}(r,n))$ for inter-domain flow (i) in domain (c) going into the second neighboring domain (n) during iteration (t) in accordance with the following formula: $a_i^{(c,t)}(r,n)=\Delta(a_i^{(c,t-1)}(r,n), \pi_i^{(c,t-1)}(r,n), \ldots )$, where r denotes a domain border element (DBE) associated with the rate allocation limit $(a_i^{(c,t)}(r,n))$, $a_i^{(c,t-1)}(r,n)$ is the rate allocation limit for the inter-domain traffic flow (i) in the second neighboring domain (n) in iteration (t−1), $y_i^{(c,t-1)}(r,n)$ is a rate allocation to the inter-domain traffic flow (i) in domain (c) in iteration (t−1), and $\pi_i^{(c,t-1)}(r,n)$ is the rate supported by the second neighboring domain (n) in response to $y_i^{(c,t-1)}(r,n)$ in iteration (t−1).

22. The method of claim 17, further comprising:
sending, by the SDN controller, inter-domain feedback information to the first neighboring SDN controller and the second neighboring SDN controller, the inter-domain feedback information specifying the inter-domain resource reservation.

23. The method of claim 17, further comprising:
computing, by the SDN controller, intra-domain resource requirements in accordance with the inter-domain rate allocation information, wherein the intra-domain resource requirements corresponds to an amount of resources on intra-domain links of the domain needed to transport remotely originating inter-domain traffic within the domain; and
provisioning, by the SDN controller, resources in the domain in accordance with the intra-domain resource requirements.

24. A software defined networking (SDN) controller assigned to a domain, the SDN controller comprising:
a processor; and
a computer readable storage medium storing programming for execution by the processor, the programming including instructions to:
receive inter-domain rate allocation information from at least a first neighboring SDN controller, the first neighboring SDN controller being assigned to a first neighboring domain that is connected to the domain via one or more inter-domain links, wherein the instructions to receive inter-domain rate allocation information includes instructions to receive a rate demand of an inter-domain traffic flow from the first neighboring SDN controller, the inter-domain traffic flow being communicated from the first neighboring domain to a second neighboring domain via the domain, wherein the domain is positioned in-between the first neighboring domain and the second neighboring domain;

compute an inter-domain resource reservation in accordance with the inter-domain rate allocation information, the inter-domain resource reservation indicating resources on the one or more inter-domain links reserved for carrying inter-domain traffic originating from outside the domain; and provision resources in the domain in accordance with the inter-domain resource reservation.

* * * * *

UNITED STATES PATENT AND TRADEMARK OFFICE
CERTIFICATE OF CORRECTION

PATENT NO.        : 9,559,980 B2
APPLICATION NO.   : 14/168682
DATED             : January 31, 2017
INVENTOR(S)       : Li It is certified that error appears in the above-identified patent and that said Letters Patent is hereby corrected as shown below:

In the Claims

In Column 16, Lines 33 and 34, Claim 21, delete the equation and insert

-- $a_i^{(c,i)}(r,n) = \Delta(a_i^{(c,i-1)}(r,n), y_i^{(c,i-1)}(r,n), \pi_i^{(c,i-1)}(r,n),...)$ --.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*